United States Patent [19]

Blount

[11] Patent Number: 5,039,711

[45] Date of Patent: Aug. 13, 1991

[54] PRODUCTION OF FLAME-RETARDANT POLYOL-OXIDATED SILICON-ACIDIC BORON EMULSION

[76] Inventor: David H. Blount, 6728 Del Cerro Blvd., San Diego, Calif. 92120

[21] Appl. No.: 411,928

[22] Filed: Sep. 25, 1989

[51] Int. Cl.$^5$ ............................ C08J 9/14; C08J 9/20; C07F 7/02
[52] U.S. Cl. .................................... 521/105; 521/85; 521/86; 521/103; 521/123; 521/127; 521/110; 556/402
[58] Field of Search ................... 521/85, 86, 103, 110, 521/123, 127; 556/402

[56] References Cited

U.S. PATENT DOCUMENTS

| | | | |
|---|---|---|---|
| 4,280,006 | 7/1981 | Blount | 521/110 |
| 4,306,035 | 12/1981 | Baskent et al. | 521/110 |
| 4,760,099 | 7/1988 | Canaday et al. | 521/110 |

*Primary Examiner*—Morton Foelak
*Assistant Examiner*—John M. Cooney, Jr.

[57] ABSTRACT

Stable flame-retardant polyol-oxidated silicon-acidic boron emulsions are produced by mixing and reacting a liquid organic polyol, and oxidated silicon compound and an acidic boron compound. This flame-retardant emulsion is useful in the production of flame-retardant polyurethane, polyester and polyesteramide products.

23 Claims, No Drawings

PRODUCTION OF FLAME-RETARDANT POLYOL-OXIDATED SILICON-ACIDIC BORON EMULSION

BACKGROUND OF THE INVENTION

This invention related to a process for the production of a stable polyol-oxidated silicon-acidic Boron emulsion. This stable emulsion and or suspension is produced by mixing a hydrated or dry powdered oxidated silicon compound and a powdered acidic boron compound in a liquid polyol. I have discovered that when boric acid is mixed with an alkali silicate compound in a polyol most of the boric acid remains as boric acid and functions as a very good flame-retardant in the production of polyurethane foamed products.

Organic-inorganic emulsions and suspension, were produced in U.S. Pat. Nos. 4,743,624; 4,737,525; 4,778,844; 4,282,429; 4,325,859; 4,376,178; 4,296,211 and Re. 31,340 by utilizing a thixotropic agent, in the form of a silicate, to stabilize the emulsion. In this invention an acidic boron compound is added to produce a flame-retardant product. The addition of boric acid greatly improves the flame-retardant properties of products such as polyester silicate resins, polyesteramide silicate resins and polyurethane silicate products. It is known in the arts that salts of boric acid are not very useful as a flame-retardant because other flame-retardants must be added with them to be useful. In the novel process of this invention only a small amount of acid boron compounds are necessary to produce a flame-retardant product because the molecules of the boric acid are well distributed throughout the product. In the process of this invention, low cost and readily available compounds are utilized and there is an improvement in the cost of the product, in the amount of flame-retardant needed, an in the production of inexpensive flame-retardant compounds.

When the flame-retardant emulsions of this invention is to be used in the production of polyurethane silicate products, it is necessary to utilize a basic compound such as alkali metal silicate and alkaline earth metal silicates to adjust the pH. Boric acid is a reaction retarder and slows the chemical reaction therefore a satisfactory polyurethane silicate foam can not be produced unless the pH is elevated. to above a pH of 6, preferably to a pH of 7 or above. The pH is elevated by adding a basic compound to the emulsion or mixture of the components. It is preferable that the basic compound does not react with the acid boron compound but in most of the mixtures of components some chemical reaction takes place between them. When they react together only a minimum amount of the basic compound should be used because the acid boron compound is a much better flame-retardant than the salt of acid boron compound. A combination of a basic oxidated silicon compound which react very little with the acid boron compound may be used so that free acid boron compound may be present in the emulsion or reaction mixture.

While not wishing to be bound by any theory of operation, it appears that there is some reaction of the acidic boron compounds with the oxidated silicon compound and polyol to give a much better and more stable distribution of oxidated silicon powder and acidic boron compound powder in the liquid polyol. This combination of well distributed particles of oxidated silicon compound and acidic boron compounds gives good flame-retardant properties to the emulsion and the products produced from the emulsion. Any excess of oxidated silicon compounds may be used as a filler. The combination of oxidated silicon powder and acidic boron compound powder enhances the flame-retardant emulsion of this invention is reacted with a polyisocyanate there is a chemical reaction between the polyisocyanate and the polyol, oxidated silicon compound and acidic boron compound. Excess acidic boron compounds may be used and acts as a flame-retardant filler. The boric acid may also be esterified with the polyol by heating.

SUMMARY OF THE INVENTION

A stable flame-retardant liquid polyol-oxidated silicon-acidic boron emulsion is produced by emulsifying the following components:
Component A: oxidated silicon compound
Component B: acid boron compound
Component C: liquid polyol.

COMPONENT A

And suitable oxidated silicon compound may be used in this invention. It is preferred that the oxidated silicon compound be in the form of a hydrated finely powdered compound. Suitable oxidated silicon compounds include but not limited to alkali metal silicates, alkaline earth metal silicate, metal silicates, minerals (natural silicates) containing oxidated silicon radicals, ammonium silicate, hydrated oxidated silicon compounds and mixtures thereof. Suitable alkali metal silicates include sodium silicate, potassium silicate, lithium silicate and mixtures thereof. Suitable alkaline earth metal include but are not limited to calcium silicate, strontium silicate, magnesium silicate, barium silicate and mixtures thereof.

Suitable metal silicates include, but are not limited to silicates which contain beryllium, copper, zinc, titanium, zirconium lead, arsenic, antimony, bismuth, molybdenum, tungsten, manganese, iron, nickel, cobalt and mixtures thereof.

Suitable minerals or natural silicate containing oxidated silicon compound include, but are not limited to clay, talc, kaolin, mica, wollastomite, natural zeolite, willemite, zircon, forsterite, pyrope, andalusite chrysocolla, asbestos, orthoclase, natrolite, albite, fluortalc, polylithionite, phlogopite, fluorphlogosite, hydroxyl nectorite, boron fluorphlogopite, benotolite clay, hydroxyl boron phlogopite and mixtures thereof.

Suitable hydrated oxidated silicon compounds include, but are not limited to polysilicic acid, hydrated silica, precipitated silica, silicic acid, orthosilicic acid, metasilic acid and mixtures thereof.

Sodium silicate is the preferred oxidated silicon compound in the preferred oxidated silicon compound in the form of a fine powder which will pass through a 200 mesh screen. It is preferred that the sodium silicate powder be hydrated. Aqueous alkali metal silicates may be utilized as the starting silicate material but most of the water has to be evaporated to where the alkali metal silicate is a hydrated powder because the boric acid will react with the alkali metal silicate when in an aqueous solution. The aqueous alkali metal silicate may be first mixed with the polyol then the excess water is removed by evaporation.

COMPONENT B

Any suitable acidic boron compound may be used in this invention. Suitable acidic boron compounds include, but are not limited to orthoboric acid, metaboric acid, tetraboric acid, boric oxide plus water, boron halides plus water and mixtures thereof. Boric acid powder is the preferred acidic boron compound.

COMPONENT C

Any suitable liquid polyol (organic polyhydroxyl compound), in particular, compounds which contain from 2 to 8 hydroxyl groups, especially those with a molecular weight of about 400 to about 6,000, e.g. polyesters, polyethers, polythioethers, polyacetals, polycarbonates or polyester amides containing at least 2, generally form 2 to 8, but preferably dihydric alcohols, with the optional addition of trihydric alcohols, and polybasic, preferably dibasic, carboxylic acids may be used in this invention. Instead of the free polycarboxylic acids, the corresponding polycarboxylic acid anhydrides or corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterphthalate and bisglycol terephthalate. Any suitable polyhydric alcohol may be used such as, for example, ethylene glycol; propylene-1-2 and -1,3-glycol; butylene-1,4-and -2,3-glycol; propylene-1,2- and -1,3-glycol; butylene-1,4- and -2,3-glycol; hexane-1,6-diol; octane-1,8-diol; neopentyl glycol; cyclohexanedimethenol-1(1,4-bishydroxymethyl-cyclohexane); 2-methylpropane-1,3-diol; glycerol: trimethylol propane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl and groups. Polyesters of lactones, such as -caprolactone, or hydroxycarboxylic acid such as hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenyl propane, aniline, ammonia, ethanolamine or ethylenediamine; sucrose polyethers such as those described, e.g., in German Auslegeschriften Nos. 1,175,358 and 1,064,938, may also be used according to the invention. It is frequently preferred to use polyethers which contain predominantly primary OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation of thiodiglycol with itself and/or with other glycols, dicarboxylic acids, formaldehyde, aminocarboxylic acids or amino alcohols. The products obtained are polythiomixed ethers or polythioether ester amides, depending on the co-component.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1, 3-diol; butane-1, 4-diol; and/or hexane-1, 6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Examples of these compounds which are to be used according to the invention have been described in High Polymers, Volume XVI, "Polyurethane, Chemistry and Technology", published by Saunders-Frisch Interscience Publishers, New York, London, Volume I, 1962, pages 32 to 42 and pages 44 and 54; and Volume II, 1964, pages 5 and 16 and pages 198 and 199; and in Kunststoff-Handbuch, Volume VII, Vieweg-Hochtlen, Carl-Hanser-Verlag, Munich, 1966 on pages 45 to 71.

DETAILED DESCRIPTION

The stable flame-retardant liquid polyol-oxidated silicon-acidic boron compound emulsion of this invention is produced by emulsifying the powder and liquid polyol at any suitable physical conditions. The emulsification is usually carried out at ambient temperature and pressure but in certain conditions elevated or lowered temperature and pressure may be utilized. The components may be mixed in any suitable proportions ranging from 50 to 200 parts by weight of the liquid polyol, 1 to 100 parts by weight of oxidated silicon compound and 10 to 100 parts by weight of acidic boron compound. The components may be mixed in any suitable order or may be mixed simultaneously. It is preferable to mix the oxidated silicon compound in the polyol then add the acidic boron compound at ambient temperature and pressure and emulsify the mixture.

Any suitable emulsion stabilizer may be added to the component. Organic and/or inorganic acids may be added to the mixture of component to react with alkali silicates to produce a thixotropic silicate which assists in stabilizing the emulsion. Suitable emulsion stabilizer such as surface-active additives which include emulsifiers and foam stabilizers may be used. Dispersion stabilizer may be used as an emulsion stabilizer.

Up to 20% by weight of a surface-active additive, percentage based on weight of Components A, B and C may be used in the invention. Surface-active additives such as emulsifiers which include, but are not limited to anionic, cation and non-ionic emulsifiers. Suitable emulsifiers are, but are not limited to e.g. sodium salts of ricinoleic sulphonates or of fatty acids or salts of fatty acid with amines, e.g. oleic acid diethylamine or stearic acid diethanolamine, alkali metal or ammonium salts of sulphonic acid, e.g. dodecylbenzene sulphonic acid or dinapthyl methane disuphonic acid or fatty acids such as ricinoleic acid or polymeric fatty acids. The emulsifier may be added to components A, B or C in an amount up to 20% by weight, based on weight of components A, B and C.

The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308. They may be added to components A, B or C in an amount of up to 20% by weight, based on weight of components A, B and C.

Dispersion stabilizers such as salts of polymethacrylic acid, copolymeric poly(methacrylic acids), polymaleic acids and copolymeric polymaleic acids; water-soluble derivatives of cellulose plant gums, casein, starch, sodium alginate; antumony oxide, bentonite, natural and synthetic latexes, sulfonated polyisoprene resins, sulfonated phenol-formaldehyde resins, sulfonated melamine-formaldehyde resins, polyamines, polysilicic acid, sodium poly(methacrylic silicate), poly(sodium acrylic silicate), copolymeric poly(sodium methacrylic silicate), polyvinyl decanol and mixtures thereof. The dispersion stabilizer may be used in an amount up to 10% by weight, percentage based on components A, B and C and added to components A, B or C.

Any suitable compound which contains one or more active hydrogens may be used in this invention to react with polyisocyanates such as alcohols, thioalcohols, phenols, thiophenols, aldehydes, carboxylic acid bromides, sulphonic acid chlorides, organic esters, ethers, thioethers, halomethyl compounds, ketones, nitriles, sulphonic acids, amines and mixtures thereof. Compounds which contain one OH group and/or at least one other hydrophilic and/or polar group which has the general formulae:

RSH, RCH$_2$CL, RCH$_2$Br, RCH$_2$I, RCN, RNO$_2$, RCOCL,

RCOBr, RSO$_2$CL, RCOOH, RS$_2$OH, RCOO$^-$, RSQ$^-$,

ROR, CH$_3$—C—R,
$\phantom{ROR, CH_3—}\|$
$\phantom{ROR, CH_3—}$O wherein R denotes a methyl, ethyl or propyl group, may be used in this invention.

Any suitable epoxy compound may be used in this invention to react with polyisocyanate. Suitable epoxy compounds include but are not limited to ethylene oxide, propyleneoxide, butylene oxide, tetrahydrofuran, styrene oxide, epihalohydrins and polyepoxy compounds. Polyepoxy compounds are preferred, but not limited to, a list of suitable polyepoxy compounds is found in U.S. Pat. No. 4,292,413 page 2–4 and is incorporated into this application. The polyepoxy compounds are well known in the Arts and are the preferred epoxy compound.

COMPONENT D

Any suitable organic compound containing at least 2 isocyanate radicals may be used in this invention. Suitable organic polyisocyanates may be aliphatic, cycloaliphatic, araliphatic, aromatic and heterocyclic polyisocyanates are well known in the arts. Suitable polyisocyanates which may be employed in the process of the invention are exemplified by the organic diisocyanate which are compounds of the general formula:

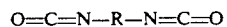

$$O=C=N-R-N=C=O$$

wherein R is a divalent organic radical such as an alkylene, aralkylene or arylene radical. Such radicals may contain, for example 2 to 20 carbon atoms. Other polyisocyanates, polyisothioryanates, fatty diisocyanates, and their derivatives may be equally employed. Inorganic and silicon polyisocyanate are also suitable according to the invention. Examples of useful polyisocyanate may be found listed in U.S. Pat. No. 4,296,211, page 4–6, in High Polymers, Volume XVI, "Polyurethane Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199 and are incorporated herein by reference.

It's generally preferred to use commercially readily available polyisocyanate, e.g., tolylene-2,4 and -2,6 diisocyanates and any mixtures of these isomers ("TDI") Polyphenyl-polymethylene-isocyanates obtained by aniline-formaldehyde condensation followed by phosgenation and modified polyisocyanates. The preferred compound with at least two isocyanate radicals are polyphenyl-polymethylene-isocyanates obtained by aniline-formaldehyde condensation followed by phosgenation.

Any suitable compound which contains 1 or more isocyanate radicals and one or more unsaturated bonds which will polymerize may be used in this Invention. The unsaturated oliphatic isocyanates which has double-bond vinyl functionality in the same molecule are preferred. Hydroxyethyl methacrylate may be reacted with tolylene diisocyanate or with NCO-terminated prepolymer to produce compound with vinyl functionality and isocyanate functionality in the same molecule. The double-bond vinyl radical may be cured with free-radical initiators such as an organic hydroperoxide. The isocyanate radical may be cured and foamed with a compound containing attached water.

The flame-retardant polyurethane products may be produced under any suitable physical condition. The components may be mixed in any suitable physical condition. The components may be mixed in any suitable manner. They may be mixed simultaneously or Components A and B may be mixed with Component C and/or Component D. It is preferable to mix Components A and B in Component C, then mix with Component D at ambient temperature and pressure. The optional component may be added to the mixture of A, B and C before adding Component D. Optional components include, water, initiator, filler, diluent, blowing agent, emulsifying agent, activator, foam stabilizer, modifying compounds, etc.

The proportions of the reactants and other compounds used in this invention may vary within the following ratios:

a) 1 to 100 parts by weight of Component A;
b) 10 to 100 parts by weight of Component B;
c) 50 to 200 parts by weight of Component C;
d) 25 to 300 parts by weight of Component D;
e) Up to 50 percent by weight of an inert liquid, boiling in the range of $-25°$ C. to $80°$ C.;
f) Up to 10 percent by weight of an amine urethane catalyst;
g) Up to 20 percent by weight of foam stabilizer;
h) Up to 20 percent by weight of emulsifying agent;
i) Up to 300 percent by weight of inorganic or organic particulate or pulverulent material;
j) Up to 300 percent of a modifying compound;
k) Up to 10 parts by weight of water
l) Up to 25 percent by weight of phase-change material;
m) Up to 5 percent by weight of a free-radical-initiator;
n) up to 10 percent of an organo-metal urethane catalyst;
o) 10 to 50 parts by weight of a polycarboxylic acid and/or a polycarboxylic acid anhydride per 100 parts by weight of flame-retardant emulsion.

Percentages are based on weight of components A, B and C.

When producing foams by the process according to the invention, blowing agents may be used, even when using NCO-prepolymers which give rise to the evolution of carbon dioxide. The blowing agents which are suitable for this purpose are inert liquids boiling within a range of $-25°$ C. to $+80°$ C. and preferably $-15°$ C. to $+40°$ C. They are used in quantities of 0–50 percent by weight, preferably 2–30 percent by weight when needed, based on the reaction mixture.

Suitable organic blowing agents are, e.g., acetone, ethyl acetate, methanol, ethanol, halogen-substituted alkanes such as methylene chloride, chloroform, ethylidene chloride, vinylidene chloride, monofluorotrichloromethane, chlorodifluoromethane or dichlorodifluoromethane, butane, hexane, heptane or diethyl ether. Substances which decompose at temperatures above room temperature to liberate gases such as azoisobutyric acid nitrile, may also act as blowing agents. Other examples of blowing agents and details concerning the use of blowing agents are described in Kunststoff-Handbuch, Volume VII, published by Vieweg and Hochtlen, Carl-Hanser-Verlag, Munich 1966, e.g., on pages 108 and 109, 453 to 455 and 507 to 510.

Catalysts which promote the reaction of isocyanates with reactive hydrogen are also often used according to the invention in catalytic amounts. Catalysts known per se may be used, e.g., tertiary amines such as triethylamine, tributylamine, N-methyl-morpho-line, N-ethyl-morphonine, N-cocomorpholine, N,N,N',N'-tetramethylethylene diamine, 1,4-diaza-bicyclo(2,2,2)-octane, N-methyl-N'-dimethylaminoethyl piperazine, N,N-dimethyl benzylamine, bis-(N,N-diethylaminoethyl)-adipate, N,N-dimethyl cyclohexylamine, N,N,N',N'-tetramethyl-1,3-butane diamine, N,N-dimethyl-B-phenyl ethylamine, 1,2-dimethyl imidazole or 2-methyl imidazole.

Suitable tertiary amine catalysts with hydrogen atoms which are reactive with isocyanate groups include, e.g., triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silaamines which have carbon-silicon bonds as described, e.g., in German Patent Specification No. 1,229,290 may also be used as catalysts, e.g., 2,2,4-trimethyl-2-silamorpholine or 1,3-diethylaminomethyl-tetramethyl-disiloxane.

Bases which contain nitrogen, such as tetraalkyl ammonium hydroxides, alkali metal hydroxides such as sodium hydroxide, alkali metal phenolates such as sodium phenolate or alkali metal alcoholates such as sodium methylate may also be used as catalysts. Hexahydrotriazines are also suitable catalysts. These amines and other basic catalyst may also be used to adjust the pH to above 7.

Organic metal compounds may also be used as catalysts according to the invention, particularly organic tin compounds.

The organic tin compounds used are preferably tin-(II) salts of carboxylic acids such as tin(II)-acetate, tin(II)-octoate, tin(II)-ethyl hexoate and tin(II)-laurate and the dialkyl tin salts of carboxylic acids such as dibutyl tin diacetate, dibutyl tin dilaurate, dibutyl tin maleate or dioctyl tin diacetate.

Other representatives of catalysts which may be used according to the invention and details concerning the action of the catalysts have been described in Kunststoff-Handbuch, Volume VII, published by Vieweg and Hochtlen, Carl-Hanser-Verlag, Munich, 1966, e.g., on pages 96 to 102.

The polyurethane catalysts or activators are generally used in any catalytic amount, preferably in a quantity up to 10 percent by weight, based on the reactive mixture.

A surface-active additive (emulsifiers and foam stabilizers) may be added to the components. Any suitable surface-active additive may be used. The surface-active additive may be non-ionic, anionic or cation. Suitable surface-active additive include, but not limited to, the sodium salts of ricinoleic sulphonates or of fatty acids or salts of fatty acid with amines, e.g., oleic acid diethylamine or stearic acid diethanolamine, alkali metal or ammonium salts of sulphonic acid, e.g., dodecylbenzene sulphonic acid or dinaphthyl methane disulphonic acid, or fatty acids such as ricinoleic acid, or polymeric fatty acids and others. The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308.

Solid inert fillers may be added to the components. They may be organic or inorganic substances and may be in the form of powders, hollow beads, granulate, wire, fibers, dumb bells, crystallites, spirals, rods, beads, foam particles, webs, woven fabric, ribbons, etc. Any commonly known inert filler known in the Arts may be used.

Any suitable initiator which will promote the polymerization of a solution of a vinyl monomer may be used in this invention. The controlled polymerization of the vinyl monomer in a polyol, in order to yield fully cured solids, usually required the use of an initiator. Only a catalytic amount of an initiator is needed and the amount may vary up to 1% by weight based on the vinyl monomer.

Any suitable free-radical initiator, such as organic and inorganic peroxides, azo compounds, alkali metal persulfates, ammonium persulfates and mixtures thereof, may be used. The fact that the action of organic peroxide can be modified by activators and promoters, plus their ready availability at reasonable cost, makes them preferably in this invention. Thermal and photopolymerization may be used in certain cases.

Suitable organic peroxide initiators include, but are not limited to, acetyl benzoyl peroxide, methyl ethyl ketone peroxide, cyclohexanone peroxide, cyclohexyl hydroperoxide, 2,4-dichlorobenzyl peroxide, cumene hydroperoxide, tert-butyl hypoperoxide, methyl amyl ketone peroxide, lauryl peroxide, benzoyl peroxide, tert-butyl perbenzoate, di-tert-butyl diperphthalate, and mixtures thereof.

Activators and promoters, used in conjunction with the initiators such as cobalt which, in the form of its ethyl hexanoate or naphthanate salt, is a good, general-purpose activator for use with ketone peroxides, may be added to the vinyl monomer. Concentration as low as 30 ppm of cobalt metal will activate a system.

Other activators may be added to the vinyl monomers such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

Promoters used with acyl peroxide include tertiary dialkyl aryl amines such as diethyl aniline and aliphatic thiols, such as, for example, lauryl mercaptan. Concentrations used are most often in the range of up to 0.5% of active substances. Promoters usually are strong reducing agents and initiators are strong oxidizing agents.

Suitable alkali metal persulfates include potassium and sodium persulfate. Redox systems may also be utilized in this invention.

Epoxy catalyst may be used with the epoxy compounds. Suitable epoxy catalyst include amines, Lewis acids, alkali metal oxides and hydroxides and mercaptan-terminated liquid compounds. A list of these compounds may be found in U.S. Pat. No. 4,383,089 pages 5–12 and is incorporated into this Application.

Any suitable modifying or additive compound may be used in the reaction of this invention to vary properties of the product. Typical modifying compounds include polyepoxides, polysulfides, polymers, alkali sulfides, aminoplasts, phenoplasts, fatty or rosin acids, furfural-ketone resin, styrene oxide, cellulose, lignin, vegetable oil, melamine, urea, furan compounds, vinyl monomers with catalyst, vinyl polymers, aliphatic dienes, diene polymers, halogenated aliphatic and aromatic compounds, triallyl cyanurate, polyepichlorohydrin polymers, alkali metal phenols, polyester resins with catalyst, aldehydes, ketones, alkali metal silicates, aqueous alkali metal silicates, fumed silica, hydrated silica, polysilicic acid, perchloroethylene, benzoate esters, phthalate esters, polyester benzoate, water-binding agents, etc. and mixtures thereof.

Any suitable phase-change materials may be added to the components of this invention. Phase-change materials are materials that melt to store heat and freeze (solidify) to give up heat. The melting and freezing of the material takes place over a narrow temperature range, similar to ice. Heat is stored during the day and released at night when temperature drops. Suitable phase-change materials include, but are not limited to, salt hydrates, crystalline alkyl hydrocarbons (paraffin waxes), fatty acids, fatty acid esters, poly(ethylene glycol) waxed and mixtures thereof. Flame retardants may be added to change the melting and freezing points. The various phase-change materials may be mixed to obtain the desired melting and freezing points.

Any suitable flame-retardant agent may be used in this invention such as alkali metal phosphate compounds, alkaline metal earth phosphate compounds, ammonium phosphates and other salts of phosphoric acid, halogenated paraffins, organic phosphorus containing compounds, organic phosphorus and halogen containing compound and other flame-retardant agents commonly known in the Arts. Other substances such as plasticizers, dyes, stabilizers, negative catalyst, pigments, stabilizers against aging and weathering, fungicidal and bacteriocidal substances may be used in this invention. Details about methods of using these additives and their action may be found in Kunststoff-Handbuch, Volume VI; published by Vieweg and Hochtlen, Carl-Hansen-Verlag, Munich 1966, e.g. on pages 103 to 113.

Polyurethane products have many uses and these uses are well known in the Arts. The polyurethane foam produced by this invention may be use for cushioning, packaging, sound and thermal insulation, as an adhesive, as, construction material, as shoe soles, as coating agent, as cavity filler, etc.

The reactive components may be mixed and sprayed in any of the well known polyurethane foaming machines to produce in-situ insulation. The components may be used in a two component system, mixed then poured in place such as in boats for flotation. The mixed components may be pumped into molds to form auto or furniture cushions, art objects, building materials, insulation, paneling, etc.

The object of this invention is to produce stable flame-retardant polyol-oxidated silicon-acidic boron emulsions for use in the production of polyurethane, polyester and polyesteramide products.

Another object of the present invention is to provide a novel process of producing flame-retardant polyurethane products. Another object is to produce novel flame-retardant polyurethane products. Another object is to produce novel flame-retardant polyurethane products using small amounts of low-cost flame-retardant agents. Still another object is to produce flame-retardant polyurethane products that may be used for thermal insulation, structural purposes, sound proofing, shock-resistant packaging, cushions, surface coating, adhesives, casting material, putty, etc.

Still another object is to provide a process to produce a flame-retardant polyester silicate resinous product which can be used as coating agents, in production of polyurethane silicate foams, etc.

The flame-retardant polyol-oxidated silicon-acidic boron emulsion may be utilized in the production of flame-retardant polyester silicate resins. About 100 parts by weight of a polycarboxylic acid and/or a polycarboxylic acid anhydride by heating the mixture at a temperature between the melting temperature of the polycarboxylic acid and the boiling temperature of the polyhydroxyl organic compound while agitating for 20 to 120 minutes thereby producing a flame-retardant polyester silicate resin.

The useful polyol and polycarboxylic acids and/or polycarboxylic acid anhydrides were previously listed. The polyols and polycarboxylic acid may be saturated or unsaturated. The flame-retardant polyester resins may be further reacted with a vinyl and/or diene monomer.

This flame-retardant polyester silicate resin may be utilized as coating agents, molding agents, in production of polyurethane silicate foams, adhesives, etc.

DESCRIPTION OF PREFERRED EMBODIMENTS

My invention will be illustrated in greater detail by the specific examples which follow, it being understood that theses preferred embodiments are illustrative of, but not limited to, procedures which may be used in the production of flame-retardant polyurethane products. Parts and percentages are by weight unless otherwise indicated.

EXAMPLE 1

About 50 parts by weight of hydrated sodium silicate ($SiO_2:Na_2O$ ratio of 3.25:1, contains 20% attached water) powder that passes thur a 200 mesh screen, 45 parts by weight of boric acid powder and 100 parts by weight of a polypropylene triol (mol. wt.-3000 Hydroxyl No. 56) are poured into an emulsifier and thoroughly emulsified. The chemical reaction is complete in 8 to 12 hours.

EXAMPLE 2

Example 1 is modified wherein 5 parts by weight of an emulsion stabilizer is added with the components and selected from the list below:
a) antimony oxide
b) bentonite
c) sulfonated melamine-formaldehyde resin
d) polysilicic acid
e) sodium poly(methacrylic acid)
f) clay
g) sodium polymaleic acid
h) sodium salts of oleic acid
i) potassium salt of ricinoleic sulphonate
j) sodium doctyl sulfosuccionate
k) ammonium salt of dodicylbenzene sulphonic acid
l) polyester siloxane (L6202 by Union Carbide)
m) diethanolamine salt of stearic acid
n) trisodium phosphate
o) sodium borate
p) diethanolamine salt of boric acid
q) urethane foam surfactant (LK-221 by Air Products)
r) precipitated silica
s) polyvinyl alcohol
t) plant gum
u) starch
v) calcium doctyl sulfosuccionate
w) urea
x) fumed silica
y) sodium alginate
z) mixtures of the above.

EXAMPLE 3

Example 1 is modified by substituting 50% of the sodium silicate powder with a powder selected from the list below:
a) potassium silicate powder ($SiO_2:Na_2O$ ratio is 2.0:1)
b) sodium silicate powder ($SiO_2:Na_2O$ ratio is 3.25:1, 20% hydrated water)
c) polysilicic acid
d) silica
e) talc
f) wallostomite
g) hydrated alumina
h) clay
i) calcium carbonate
j) calcium silicate
k) fluortalc
l) mica
m) hydrated silica
n) antimony trioxide
o) magnesium silicate
p) Portland cement
q) feldspar
r) asbestos
s) willemite
t) magnesium oxide
u) natural zeolite
v) Kaolin
w) boron fluorphlogopite
x) titanium oxide
y) calcium carbonate
z) and mixtures thereof.

EXAMPLE 5

About 60 parts by weight of the emulsion produced in Example 1 is mixed with 0.5 parts by weight of a foam stabilizer (L6202 by Union Carbide), 0.3 parts by weight of tin octoate, 0.4 parts by weight of an amine urethane catalyst (DABCO R8020 by Air Products) and 0.4 parts by weight of water are thoroughly mixed and re-emulsified then mixed with 16 parts by weight of tolylene diisocyanate (TDI 80 by MOBAY). The mixture expands to produce a strong, flexible foam of about 1.7 pounds/cu. ft. on flame testing the superficial layer of foam burns until a char is formed then the flame goes out.

EXAMPLE 6

Example 5 is modified wherein 30 parts by weight of a polyisocyanate is used in place of tolylene diisocyanate and selected from the list below:
a) Polymeric MDI (MONDUR MR by MOBAY)
b) Polymeric MDI (PAPI 27 by DOW)
c) modified polyisocyanate (MONDUR by MOBAY)
d) methyl diphenyl isocyanate

EXAMPLE 7

Example 5 is modified wherein 5 parts by weight of methylene chloride is added to the reactive mixture.

EXAMPLE 8

About 50 parts by weight of Calcium silicate powder that will pass thur a 200 mesh screen, 30 parts by weight of boric acid and 100 parts by weight of ethylene oxide/propylene oxide polyol(viscosity 857, hydroxyl No. 335) are added into an emulsifier and emulsified. The chemical reaction is complete in 8 to 12 hours.

EXAMPLE 9

Example 8 is modified wherein another polyol is used and selected from the list below:
a) Sucrose polyether polyol hydroxyl no. 380
b) Sucrose amine polyol, hydroxyl no. 413
c) phenyl amine polyol, hydroxyl no. 350
d) poly(oxyalkylene)polyol, hydroxyl no. 388
e) polyester polyol, hydroxyl no. 275
f) aromatic polyester polyol, hydroxyl no. 405
g) chlorinated polyhydroxypolyester, hydroxyl no. 193
h) methyl glycoside-based polyol, hydroxyl no. 340
i) phenol-formaldehyde resin, hydroxyl no. 140 j) phenol-formaldehyde resin with furfuryl alcohol and melamine, hydroxyl no. 140
k) polyethylene oxide, monoalcohol with mol. wt. 782
l) urea-formaldehyde resin polyol, hydroxyl no. 120
m) aromatic polyol, hydroxyl no. 375
n) amine polyol, hydroxyl no. 475
o) sorbitol-based polyol, hydroxyl no. 490
p) polypropylene polyol with urea, hydroxyl no. 380
q) phosphorus-containing polyol (VIROL-82 by MOBIL), hydroxyl no. 205
r) mixtures of the above

EXAMPLE 10

Example 1 is modified wherein another polyol is used and selected from the list below:
a) ethylene glycol
b) propylene glycol
c) glycerol
d) diethylene glycol
e) dipropylene glycol
f) triethylene glycol
g) tripropylene glycol
h) polypropylene triol, mol. wt. 3,500, hydroxyl no. 56
i) castor oil
j) ethylene oxide/propylene oxide triol, hydroxyl no. 58
k) polypropylene diol, viscosity 93, hydroxyl no. 28
l) hydroxyl-terminated homopolymer of butadiene, hydroxyl no. 46.6, mol. wt. 2,800 (Poly bd R-45 HT by ARCO)
m) caprolactone diol, mol. wt. 2,000, hydroxyl no. 56
n) polyurea-filled polyol, hydroxyl no. 28
o) mixtures of the above

EXAMPLE 11

Example 8 is modified wherein 60 parts by weight of the flame-retardant emulsion is mixed with 1 part by weight of a foam stabilizer (L5420 by UNION CARBIDE), 0.2 parts by weight of an amine urethane catalyst (DABCO R8020 by Air Products), 0.1 part by weight of tin octoate, 0.5 parts by weight of water, 5 parts by weight of trichlorofluoromethane and 40 parts by weight of polymeric MDI (MONDUR MR by MOBAY) are thoroughly mixed. The mixture expands to produce a rigid flame-retardant urethane silicate foam of about 2 lbs./cu. ft. The cured foam was flame tested with a propane torch flame approximately one inch in length and applied about 1 inch from the foam. The flame was left in place for 15 seconds. In 5-10 seconds the superficial layer burned then a char was formed and the flame went out. The charred area remained red hot but the underlying foam did not burn.

EXAMPLE 12

Example 8 is modified wherein 15 parts by weight of a liquid phase-change material, a mixture of paraffin waxes with a freezing (solidifying) point of about 70° F. and a melting point of about 72° F. is added to the flame-retardant emulsion.

EXAMPLE 13

About 30 parts by weight of polypropylene triol (mol. wt. 3000, hydroxyl no. 56), 40 parts by weight of boric acid powder, 40 parts by weight of hydrated sodium silicate powder that passes thur a 65 mesh screen and contains about 30 hydrated water, 0.5 parts by weight of a foam stabilizer (L6202 by UNION CARBIDE), 0.3 parts by weight of tin octoate and 0.3 parts by weight of an amine urethane catalyst (DABCO R8020 by AIR PRODUCTS) are emulsified then mixed with 16 parts by weight of tolylene diisocyanate (TDI 80 by MOBAY). The mixture expands to a strong flexible flame-retardant urethane silicate foam of about 1.6 lbs./cu. ft.

This foam was tested after 1 week using a propane torch with a flame of about 1 inch and placed about one inch from the foam for 15 seconds. The superficial layer burns off in 5 to 10 seconds to form a char, then the flame goes out. The charred area remains red hot but the foam doesn't burn any further.

EXAMPLE 14

About 50 parts by weight of aqueous sodium silicate ($SiO_2:Na_2O$ ratio of 1.6:1, contains 40% by weight of water), 3 parts by weight of adipic acid and 100 parts by weight of polypropylene triol (mol. wt. 3000, hydroxyl no. 56) are emulsified in an emulsifier at about 70° C. then the water content of the sodium silicate solution is reduced to about 30% by weight by evaporating off the water and the remaining water is attached to the sodium silicate molecule. About 40 parts by weight of boric acid powder is added then the mixture is emulsified thereby producing a flame-retardant polyol-silicate-boric acid emulsion. The chemical reaction is complete in 8 to 12 hours.

EXAMPLE 15

Tolylene diisocyanate is reacted with hydroxyethyl methacrylate to produce a NCO-terminated prepolymer, then 60 parts by weight of the prepolymer is mixed with 20 parts by weight of the flame-retardant emulsion produced in Example 14, 0.5 parts by weight of triethylamine, 0.2 parts by weight of tin octoate and a catalytic amount of organic hyproperoxide. The mixture cures into a flame-retardant microcellular foam.

EXAMPLE 16

About 20 parts by weight of hydrate sodium silicate (SiO:NaO ratio of 3.25:1, contains 20% water) powder, 20 parts by weight of boric acid powder, 5 parts by weight of glycerol and 30 parts by weight of dipropylene glycol are emulsified in an emulsifier, then 10 parts by weight of phthalic anyhydride and 30 parts by weight of fumaric acid are added and the mixture then heated to a temperature between the melting point of phthalic anhydride and the boiling temperature of dipropylene glycol while agitating for 20 to 90 minutes. The temperature is then gradually increased, up to 250° C., while agitating until the desired viscosity is obtained thereby producing a flame-retardant polyester silicate resinous product.

EXAMPLE 17

Example 1 is modified wherein the boric acid and polypropylene is first heated to 100°-120° C. for 30 minutes while agitating for 30 minutes thereby esterifying part of hydroxyl radicals on the polyol with boric acid then the sodium silicate is added.

EXAMPLE 18

Example 8 is modified wherein the boric acid and polyol is first heated to 100°-120° C. while agitating for 30 minutes thereby esterifying part of the hydroxyl radicals on the polyol then the calcium silicate is added.

Although specific materials and conditions were set forth in the above examples, there were merely illustrative of preferred embodiments of my invention. Various other compositions, such as the typical materials listed above, may be used where suitable. The reactive mixtures and products of my invention may have other agents added thereto to enhance or otherwise modify the reaction and products.

Other modifications of my invention will occur to those skilled in the Art upon reading my disclosure. These are intended to be included within the scope of my invention, as defined in the appended claims.

I claim:

1. The process for the production of flame-retarded liquid polyol-oxidated silicon-acidic boron emulsion which process consist of emulsifying and reacting the following components:
   (A) oxidated silicon compound in the amount of 1 to 100 parts by weight;
   (B) acidic boron compound in the amount of 10 to 100 parts by weight;
   (C) liquid polyol in the amount of 50 to 200 parts by weight.

2. The product produced the process of claim 1.

3. The process of claim 1 wherein the oxidated silicon compound is selected from the group consisting of alkali metal silicates, alkaline earth metal silicates, hydrated oxidated silicon compounds, natural silicate and mixtures thereof.

4. The process of claim 1 wherein the acidic boron compound is boric acid.

5. The process of claim 1 wherein up to 20% by weight, based on weight of Components A, B and C of an emulsifier is added to components A, B or C.

6. The process claim 1 wherein up to 20% by weight, based on weight of Components A, B and C, of a foam stabilizer is added to Components A, B or C.

7. The process of claim 1 wherein up to 10% by weight, based on weight of Components A, B and C, of a dispersion stabilizer is added to Components A, B or C.

8. The process of claim 1 wherein the liquid polyol is selected from the group consisting of polyhydric alcohol, polyesters, polyethers, polythioethers, polyacetals, polycarbonates, polyester amides containing at least 2 hydroxy groups, and mixtures thereof.

9. The product produced by the process of claim 1 wherein an organic compound containing at least two isocyanate radicals in the amount of 25 to 300 parts by weight is added with Components A, B and C thereby producing a flame-retardant polyurethane silicate product.

10. The product produced by the process of claim 9 wherein up to 20% by weight of a foam stabilizer, up to 10% by weight of an amine urethane catalyst, up to 50% by weight of a blowing agent and up to 10% by weight of an organo-metal urethane catalyst is added to Components A, B and C, percentage based on weight of Components A, B and C, thereby producing a foamed flame-retardant polyurethane silicate product.

11. The product produced by the process of claim 9 wherein the compound containing at least 2 isocyanate radicals is an organic polyisocyanate.

12. The flame-retardant product produced by mixing and reacting the following components:
   (A) oxidated silicon compound
   (B) boric acid
   (C) liquid polyol
   (D) organic polyisocyanate
   (E) water
   (F) amine urethane catalyst
   (G) organo-metal urethane catalyst
   (H) foam stabilizer 13. The flame-retardant product produced by mixing and reacting the following components
   (A) oxidated silicon compound
   (B) boric acid
   (C) liquid polyol
   (D) organic polyisocyante
   (E) foam stabilizer
   (F) amine urethane catalyst
   (G) organic tin catalyst
   (H) blowing agent for urethanes 14. The flame-retardant product produced by the process of claim 13 wherein up to 25 percent by weight of phase-change materials are added to Components A, B and C, percentage based on weight of Components A, B and C.

15. The flame-retardant product produced by the process of claim 13 wherein up to 300 percent by weight of a modifying compound is added to Components A, B or C, percentage based on weight of Components A, B and C.

16. The flame-retardant product produced by mixing and reacting the following components:
   (A) oxidated silicon compound
   (B) boric acid
   (C) polyol
   (D) compound containing one or more isocyanate radicals and one or more unsaturated bond which will polymerize
   (E) free-radical initiator 17. The flame-retardant product produced by the process of claim 13 wherein up to 300 percent by weight of inorganic or organic particulates or pulverulent material is added to Components A, B and C, percentage based on weight of Components A, B and C.

18. The flame-retardant product produced by the process of claim 12 wherein the oxidated silicon compound is sodium silicate.

19. The flame-retardant product produced by the process of claim 13 wherein the oxidated silicon compound is sodium silicate.

20. The flame-retardant product produced by emulsifying and reacting the following components:
   (A) hydrated sodium silicate
   (B) boric acid
   (C) liquid polyol 21. The flame-retardant product produced by mixing and reacting 100 parts by weight of the flame-retardant liquid polyol-oxidated silicon-acidic boron emulsion produced by the process of claim 1 and 10 to 50 parts by weight of polycarboxylic acid and/or a polycarboxylic acid anhydride.

22. The process of claim 1 wherein liquid polyol and acidic boron compound is first mixed and reacted to produce a partically esterified polyol with acidic boron compounds before the oxidated silicon compound is added.

23. The product produced by the process of claim 22.

* * * * *